Feb. 4, 1936.  H. B. GREENWOOD  2,030,028
SHAFT ADJUSTING MEANS
Filed Feb. 13, 1935    2 Sheets-Sheet 1

Inventor
H. B. Greenwood
By Robert Watson
Attorney

Feb. 4, 1936.  H. B. GREENWOOD  2,030,028
SHAFT ADJUSTING MEANS
Filed Feb. 13, 1935  2 Sheets-Sheet 2
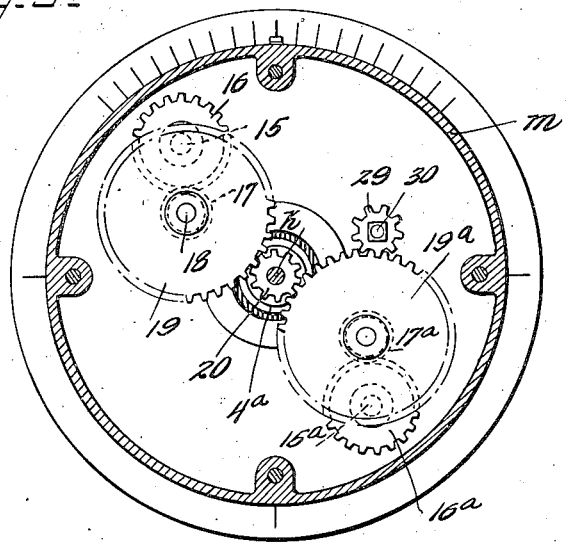
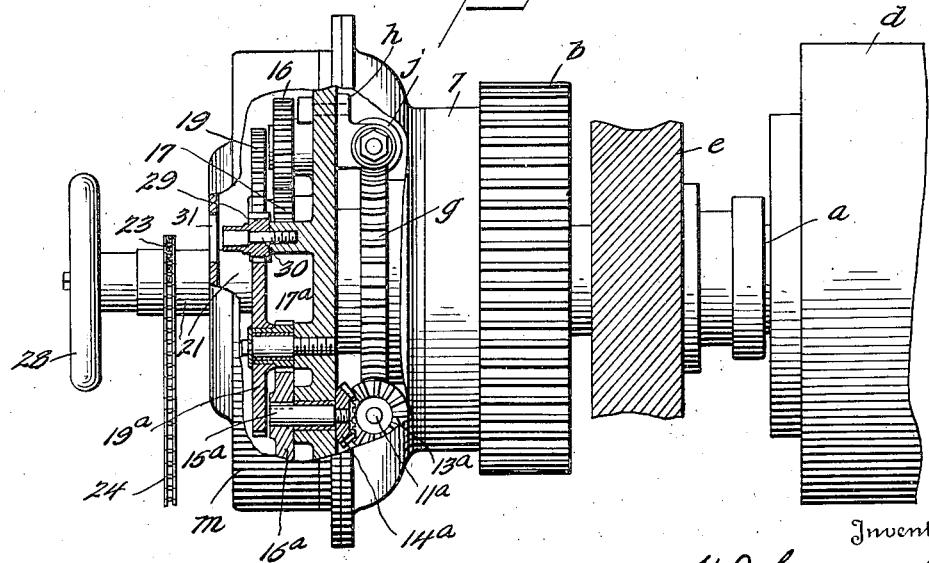
Inventor
H. B. Greenwood
By Robert Watson
Attorney Patented Feb. 4, 1936

2,030,028

UNITED STATES PATENT OFFICE 2,030,028

SHAFT ADJUSTING MEANS

Henry B. Greenwood, Glenarm, Md., assignor to F. X. Hooper Company, Inc., Glenarm, Md., a corporation of Maryland Application February 13, 1935, Serial No. 6,375

4 Claims. (Cl. 74—395)

In machines of various kinds wherein a plurality of shafts are driven in unison through a gear train, such as printing presses and machines for cutting and punching sheet or web material, it becomes necessary at times to adjust one or more of the shafts angularly with respect to its driving gear in order that the member on the shaft which prints or otherwise operates on the material passing through the machine may be brought into proper registry with the material. The present invention relates to mechanism for effecting such angular adjustment of a shaft with respect to its driving gear, while the machine is running or while the machine is stopped. Several types of adjusting mechanism for this purpose have been in use for many years, including one in which the drive gear, loose on the shaft, is operatively connected to the shaft through a worm gear and pinion, and the pinion is operated to effect the adjustment. The present improvements relate to this type.

In carrying out the invention, the worm gear is secured to the drive gear and upon a sleeve which is secured to the shaft I provide two worm pinions which mesh with the worm gear. These pinions are driven by separate reduction gear trains from a pinion on a shaft which may be operated in either direction, while the machine is running or while stopped, by a reversible electric motor which is mounted on a suitable stationary support. By operating the motor in one direction or the other, the driven shaft may be adjusted angularly with respect to its driving gear, either forwardly or backwardly and to any desired extent. It is important for the purpose of effecting proper registration to have no lost motion or back lash in the gearing connecting the sleeve with the drive gear. Therefore, while one pinion would suffice for transmitting power from the drive gear to the sleeve, I provide two worm pinions, on separate shafts, and I provide means whereby one of the worm pinions may be rotated independently of the other, when the machine is stopped, whereby the teeth of the worm gear and pinions may be kept in close engagement and back lash due to wear of the teeth may be eliminated.

In the accompanying drawings,

Fig. 3 is a section on the line 3—3 of Fig. 1, and,

Fig. 4 is a side elevation of the drive gear and adjusting mechanism, the gear casing being broken away and the gearing and sleeve being shown partly in side elevation and partly in section.

Figure 1:
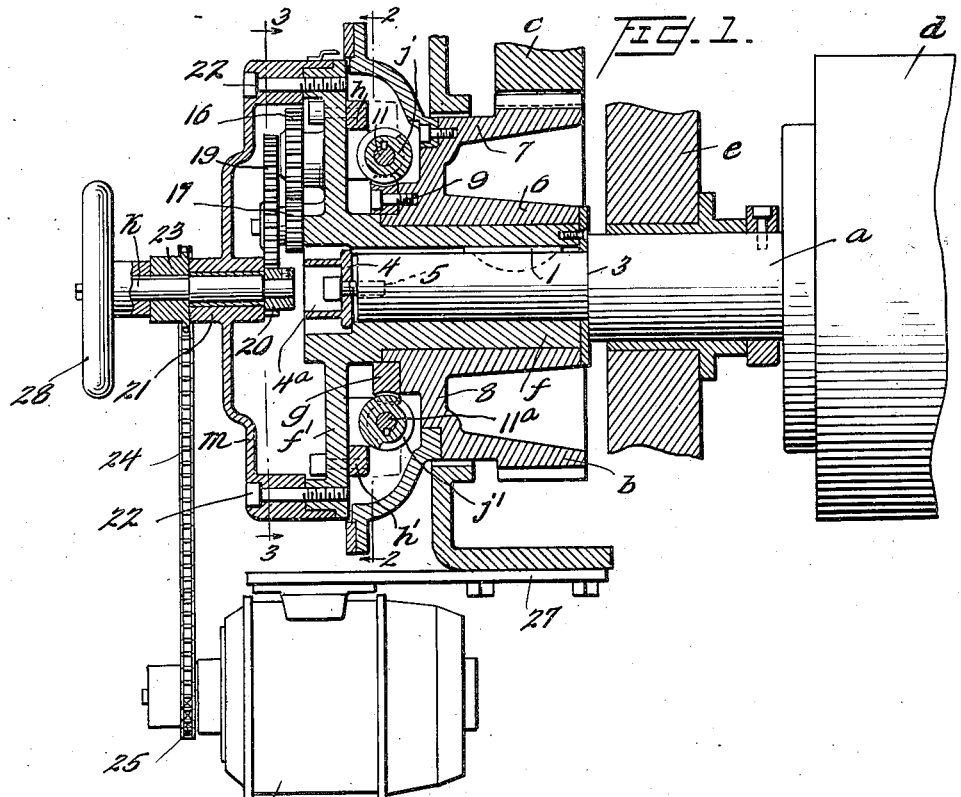
Fig. 1 is a central section through the drive gear and the adjusting mechanism taken longitudinally of the shaft upon which the mechanism is mounted, the motor for operating the mechanism being shown in elevation, secured to a stationary support.
Figure 2:
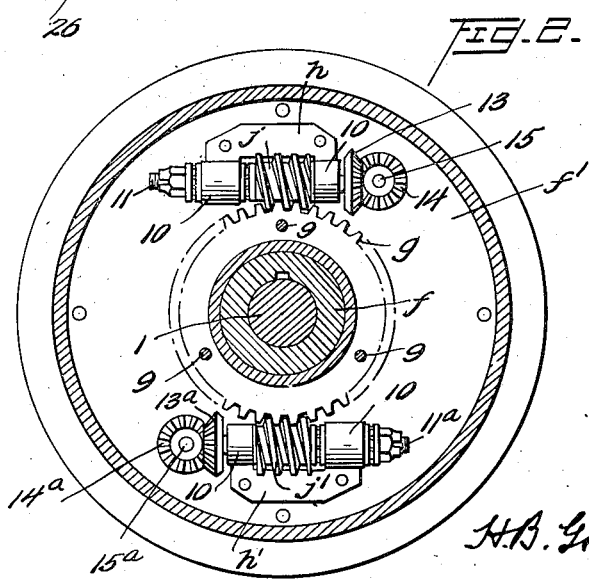
Fig. 2 is a section on the line 2—2 of Fig. 1.

Referring to the drawings, $a$ represents a shaft in a power driven machine which requires angular adjustment with respect to its driving gear $b$, which latter, it will be understood, is one member of a gear train for driving the various working parts of an organized machine, such as a printing press. Another gear in the gear train is partly indicated at $c$ in mesh with the gear $b$, and $d$ may represent a printing cylinder secured to the shaft and adjustable with it for the purpose of causing correct registry of the type with the paper sheets, web or blanks passing through the machine.

The shaft is mounted in suitable bearings in the frame $e$ of the machine, and carries at one end a sleeve $f$ which is secured to the shaft so as to rotate therewith by a key $l$. The sleeve is held against endwise movement on the shaft by a shoulder 3 on the latter and a washer-like fitting 4 having an annular socket $4^a$ concentric with the shaft, this fitting being secured to the shaft by a threaded bolt 5. The drive gear $b$ is loosely mounted on the sleeve so that the latter and the shaft to which it is secured may turn with respect to the drive gear.

The toothed portion of the drive gear is connected with the hub 6 by a web which extends laterally from the toothed portion, as shown at 7, and thence radially inward to the hub, as shown at 8. The hub extends laterally beyond the web 8 and a worm gear $g$ is fixedly secured to the end of the hub by screws 9, said gear being concentric with the shaft and sleeve. The sleeve extends beyond the end of the shaft, as shown, and has a radially extending circular head $f'$ on which are mounted at diametrically opposite points, brackets $h$, $h'$, each having spaced bearings 10. A shaft 11 mounted in the bearings of the bracket $h$ has secured thereto a worm pinion $j$ which meshes with the worm gear $g$, and a bevel pinion 13 which meshes with a similar pinion 14 on a shaft 15 which extends through the head $f'$ and is journalled therein. A spur gear 16 on this shaft meshes with a pinion 17 mounted on a stud 18 which projects from the sleeve head $f'$. A gear 19 secured to the last mentioned pinion and journalled on the stud meshes with a pinion 20 on a shaft $k$ which is journalled in a bearing 21 at the center of an annular gear casing $m$ which is secured at its periphery to the sleeve head $f'$ by bolts 22.

It will be evident from this description that when the shaft $k$ and pinion 20 are rotated, the worm pinion $j$ will also be rotated by the intermediate train of reduction gearing described. The worm pinion $j'$ is geared to the pinion 20 through a similar train of gears. Thus, the shaft 11$^a$ which carries the worm pinion $j'$ has secured thereto a bevel pinion 13$^a$ which meshes with a similar pinion 14$^a$ on a shaft 15$^a$ journalled in the head $f'$, and gears 16$^a$, 17$^a$ and 19$^a$, mounted similarly to the gears 16, 17 and 19, form a drive train between the shaft 15$^a$ and the pinion 20.

The shaft $k$, which is mounted co-axially with the shaft $a$, has a sprocket wheel 23 secured to it and a sprocket chain 24 connects this wheel with a sprocket wheel 25 on the shaft of a reversible electric motor 26. This motor is supported by a suitable base or bracket 27 secured to the frame of the machine. The shaft $k$ may also be provided with a suitable hand wheel 28 by which it may be turned when the machine is stopped, or running at a slow speed.

When the machine is in operation, the sleeve $f'$, which is interlocked with the drive gear $b$ through the worm gearing, will be driven, and since the sleeve is keyed to the shaft $a$, the latter will turn in unison with the drive gear. The motor 26, except when energized, will be driven idly by the shaft $k$ and sprocket chain. When it is desired to advance or retard the shaft $a$ with respect to the drive gear $b$, the operator, through suitable push button switches, will cause the motor to operate and rotate the worm pinions in the proper direction to turn the worm wheel, sleeve and shaft $a$ forwardly or backwardly, as desired, with respect to the drive gear. This can be accomplished while the machine is running, or while stopped. When the machine is stopped the same result can be attained by turning the hand wheel 28; but the hand wheel will ordinarily be used only in case the motor is out of order.

In order to maintain exact adjustment of the driven shaft with respect to the driving gear, it is necessary to take up all lost motion that may be due to wear between the worm gear and the worm pinions. In the present invention I provide means whereby one worm pinion may be rotated independently of the other, while the machine is stopped, and by this adjustment the teeth of the worm gear and pinions may be kept in close engagement and back lash due to wear of the teeth may be eliminated. For this purpose a pinion 29 is mounted upon a fixed spindle 30 secured to the sleeve head $f'$, and this pinion meshes with a gear in one of the gear trains, in this instance the gear 19$^a$. The pinion has a squared projection at one end adapted to receive a socket wrench which may be fitted to the projection through an opening 31 in the casing. To turn the worm pinion $j'$, the hand wheel 28 and sprocket wheel 23 are removed from the shaft $k$ and the shaft is then pushed inwardly to disengage the pinion 20 from the gears 19, 19$^a$ of the gear trains. By then applying a socket wrench to the pinion 29, this pinion and the gear train 19$^a$, 17$^a$, 16$^a$, 14$^a$, and 13$^a$ may be operated to turn said worm pinion $j'$. Turning this pinion will cause slight movement of the worm gear and the teeth of one pinion will then engage the gear teeth closely on one side of the latter, and the teeth of the other pinion will closely engage the gear teeth on their opposite sides. After the slack has been removed, the wrench is removed and the shaft $k$ is drawn outwardly to re-engage the pinion 20 with the gears 19, 19$^a$ of the gear trains. The sprocket wheel 23 and hand wheel 28 are then returned to their original positions on the shaft $k$. While the machine is in operation the pinion 29 performs no function but rotates idly. It is only used, as occasion may require, to take up slack between the teeth of the worm pinions and the worm gear.

As previously stated, a single worm pinion would suffice for adjusting the driven shaft relatively to the drive gear, but, by providing the two worm pinions and means for operating them in unison, it is possible to eliminate back lash by providing means also for turning one of said pinions independently of the other. For convenience in distinguishing the shaft $k$ which drives the gear trains from the driven shaft $a$ of the machine, the former will be termed a drive shaft in the claims while the latter will be referred to as the driven shaft.

What I claim is:

1. The combination with a driven shaft and a drive gear rotatably mounted thereon, of a worm gear fixed to the drive gear concentric with said shaft, a sleeve secured to said shaft so as to rotate therewith, two worm pinions rotatively mounted on the sleeve and meshing with the worm gear, means for rotating said pinions in unison, and means for rotating one of said pinions independently of the other pinion.

2. The combination with a driven shaft and a drive gear rotatably mounted thereon, of a worm gear fixed to the drive gear concentric with said shaft, a sleeve secured to said shaft so as to rotate therewith, two worm pinions rotatively mounted on the sleeve and meshing with the worm gear, a drive shaft supported by said sleeve co-axially with the driven shaft, a drive pinion on said drive shaft, independent gear trains connecting the latter pinion with said worm pinions, said drive shaft being adjustable to disengage the drive pinion from the gear trains, and means for manually operating one of said gear trains when the latter pinion is disengaged.

3. The combination with a driven shaft and a drive gear rotatably mounted thereon, of a worm gear fixed to the drive gear concentric with said shaft, a sleeve secured to said shaft so as to rotate therewith, two worm pinions rotatively mounted on the sleeve and meshing with the worm gear, a drive shaft supported by said sleeve co-axially with the driven shaft, a drive pinion on said drive shaft, independent gear trains connecting the latter pinion with said worm pinions, said drive pinion being disengageable from the gear trains, and means for manually operating one of said gear trains when the drive pinion is disengaged.

4. The combination with a driven shaft and a drive gear rotatably mounted thereon, of a worm gear fixed to the drive gear concentric with said shaft, a sleeve secured to said shaft so as to rotate therewith, two worm pinions rotatively mounted on the sleeve and meshing with the worm gear, a drive shaft supported by said sleeve co-axially with the driven shaft, a drive pinion on said drive shaft, independent gear trains connecting the latter pinion with said worm pinions, means whereby one of said pinions may be rotated independently of the other, and a stationary electric motor geared to said drive shaft.

HENRY B. GREENWOOD.